(12) United States Patent
Bower et al.

(10) Patent No.: US 9,676,122 B2
(45) Date of Patent: Jun. 13, 2017

(54) BARRIER FILM WITH RECLAIMED METALIZED POLYESTER

(71) Applicants: Douglas James Bower, Charlestown, RI (US); Larissa Marie Peguero, Warwick, RI (US)

(72) Inventors: Douglas James Bower, Charlestown, RI (US); Larissa Marie Peguero, Warwick, RI (US)

(73) Assignee: Toray Plastics (America), Inc., North Kingstown, RI (US)

(*) Notice: Subject to any disclaimer, the term of this patent is extended or adjusted under 35 U.S.C. 154(b) by 281 days.

(21) Appl. No.: 14/169,881

(22) Filed: Jan. 31, 2014

(65) Prior Publication Data

US 2014/0147561 A1  May 29, 2014

Related U.S. Application Data

(62) Division of application No. 13/101,261, filed on May 5, 2011, now Pat. No. 8,642,145.

(Continued)

(51) Int. Cl.
  *B29B 17/04* (2006.01)
  *B65D 81/34* (2006.01)
  (Continued)

(52) U.S. Cl.
  CPC ......... *B29B 17/0404* (2013.01); *A23L 5/15* (2016.08); *B29B 17/0042* (2013.01); *B32B 15/08* (2013.01); *B32B 15/09* (2013.01); *B32B 15/20* (2013.01); *B32B 27/08* (2013.01); *B32B 27/20* (2013.01); *B32B 27/36* (2013.01); *B65D 81/3453* (2013.01); *C08J 11/06* (2013.01); *C08L 67/02* (2013.01); *B29L 2007/008* (2013.01); *B29L 2009/003* (2013.01); *B32B 2264/105* (2013.01); *B32B 2307/50* (2013.01);
  (Continued)

(58) Field of Classification Search
  CPC ... B29B 17/0404; B29B 17/0042; A23L 5/15; B65D 81/3453; B32B 27/08; B32B 27/36; B32B 15/08; B32B 27/20; C08J 11/06; C08L 67/02; Y02W 30/62; Y02W 30/701; Y10T 428/31678; Y10T 29/49755; Y10T 29/302; Y10T 29/49751
  See application file for complete search history.

(56) References Cited

U.S. PATENT DOCUMENTS 4,493,806 A  1/1985  Hatzikelis et al.
5,049,714 A  9/1991  Beresniewicz et al.
(Continued)

FOREIGN PATENT DOCUMENTS

DE  4311138 A1  10/1994

*Primary Examiner* — John C Hong
(74) *Attorney, Agent, or Firm* — Jeffrey C. Lew

(57) ABSTRACT

A method reclaims metalized polymer film or mixtures containing metal and/or metal alloys into a metal-containing, polymeric film. The resulting film structure has better oxygen and moisture barrier properties when metalized than plain metalized polymer films. The polymer to be reclaimed, originates in sheet form, and is densified, as by shredding, pelletizing and/or re-extruding into fine particulate form such as chips or pellets. The reclaimed polymeric film can be used, in a range of concentrations, to produce biaxially oriented polyester film for metalizing.

6 Claims, 1 Drawing Sheet

Related U.S. Application Data

(60) Provisional application No. 61/332,528, filed on May 7, 2010.

(51) Int. Cl.

| | | |
|---|---|---|
| B32B 15/08 | (2006.01) | |
| B32B 27/08 | (2006.01) | |
| B32B 27/20 | (2006.01) | |
| B32B 27/36 | (2006.01) | |
| C08J 11/06 | (2006.01) | |
| C08L 67/02 | (2006.01) | |
| B29B 17/00 | (2006.01) | |
| A23L 5/10 | (2016.01) | |
| B32B 15/09 | (2006.01) | |
| B32B 15/20 | (2006.01) | |
| B29L 7/00 | (2006.01) | |
| B29L 9/00 | (2006.01) | |

(52) U.S. Cl.
CPC ... *B32B 2307/518* (2013.01); *B32B 2307/581* (2013.01); *B32B 2307/7244* (2013.01); *B32B 2307/7246* (2013.01); *B32B 2307/732* (2013.01); *C08J 2300/30* (2013.01); *C08J 2367/02* (2013.01); *Y02W 30/62* (2015.05); *Y02W 30/701* (2015.05); *Y10T 29/302* (2015.01); *Y10T 29/49751* (2015.01); *Y10T 29/49755* (2015.01); *Y10T 428/1355* (2015.01); *Y10T 428/31678* (2015.04)

(56) References Cited

U.S. PATENT DOCUMENTS

| | | |
|---|---|---|
| 5,631,066 A | 5/1997 | O'Brien |
| 6,129,779 A * | 10/2000 | Bohland ............. C22B 7/006 |
| | | 241/24.22 |
| 6,153,276 A | 11/2000 | Oya et al. |
| 2002/0046849 A1 | 4/2002 | Rapp et al. |
| 2003/0161999 A1 | 8/2003 | Kannankeril et al. |
| 2007/0135552 A1 | 6/2007 | Wrosch et al. |
| 2008/0233413 A1 | 9/2008 | Hostetter et al. |
| 2008/0233418 A1 | 9/2008 | Krueger |
| 2011/0223362 A1 | 9/2011 | Van Loon et al. |
| 2011/0274796 A1 | 11/2011 | Bower et al. |

* cited by examiner

BARRIER FILM WITH RECLAIMED METALIZED POLYESTER

FIELD OF THE INVENTION

This invention relates to metal-containing polymer film having barrier properties to resist transmission of chemicals through the film. More specifically it relates to composite film with oxygen and moisture barrier properties and having a layer of a blend that includes a component obtained from reclaimed metalized PET film.

BACKGROUND OF THE INVENTION

It is common in the polyester film industry to produce specialty high oxygen and moisture barrier films for use as protective overwrap materials on foods and other oxygen or moisture sensitive products. This can be done with a variety of technologies including, but not limited to coextrusion of barrier polymers such as poly(ethylene vinyl alcohol) "EVOH", poly(ethylene naphthalate) "PEN" and polyamides, or by subsequent coating of the film using barrier polymers such as EVOH or poly(vinylidene chloride) "PvDC".

Another common approach to creating a high moisture and oxygen barrier is to overcoat the surface of the film with a layer of metal, such as aluminum or other metals typically using vacuum deposition. The metal layer provides a nearly impenetrable and therefore excellent moisture and oxygen barrier as well as an economical cost for the applications. Representative techniques for depositing nanometer thickness metal onto barrier films are disclosed in such references as U.S. Pat. Nos. 5,631,066 and 6,153,276.

Typically, the process of making metal-overcoated polymer film, i.e., metalized film, generates waste of trim scrap. Trim scrap results from slitting rolls to custom product widths, or from recovered metalized polyethylene terephthalate "PET" film that has defects which cause rejection (e.g., wrinkles, creases, poor metalization). With non-metalized PET, it is industry practice to take trim scrap and defect material and shred it into a flake, pelletize the flake through a secondary extrusion process, crystallize those pellets so that they do not agglomerate during further processing, and use these pellets as part of the resin feed to form a layer, such as a core or skin of a multilayer PET film. That is, the reclaimed material recovered from suitable waste is blended with another component of usually a virgin PET to form the layer of the multilayer PET film.

However, metalized PET has not been recycled. The metal particles can potentially cause web breaks during film formation processing if metalized film reclaim material is fed in a similar manner to non-metalized PET reclaim material. The tendency for web breaks to occur is believed due to the difference in crystallinity Accordingly, trim scrap and defect-containing metalized PET waste has traditionally been discarded at cost of materials, processing cost, and disposal and environmental costs. An objective of this invention is to provide a process that overcomes this difficulty as well as adds benefits of improved properties of the resultant film.

SUMMARY OF THE INVENTION

Accordingly, the present invention provides the use of metalized film that has been shredded, pelletized or densified and dried/crystallized as a component for either the core or skin layer in a PET film. By appropriate processing conditions in the pelletizing operation, sufficiently small particles of the aluminum layer can be formed and dispersed in the PET resin.

BRIEF DESCRIPTION OF THE DRAWINGS

FIG. 1 is an elevation section view of an embodiment of this invention of a multilayer film with a metal layer positioned on a polymer base layer that includes metalized polymer film reclaim material.

FIG. 2 is an elevation section view of an embodiment of this invention of a multilayer film with a polymer substrate layer on which is positioned a film as depicted in FIG. 1.

FIG. 3 is an elevation section view of an embodiment of this invention in which a polymeric core layer is sandwiched between a polymer substrate layer on one side and a film as depicted in FIG. 1 on the opposite side.

DETAILED DESCRIPTION OF THE INVENTION

Reclaimed material means a substance that has been at least once formed into an article by a shape-transforming process. Usually as applied to this invention, shape-transforming process includes thermoplastic processing such as film extrusion of a polymeric composition. Virgin material means a raw material synthesized or refined from a crude mixture and which has not been processed to form an article. The reclaimed material can be recovered from manufactured articles and recycled for use as a raw material to make another product. The reclaimed material can be combined with a virgin material to form a part or a whole of the product or it can be incorporated by itself, i.e., without combining with a virgin material.

This invention particularly relates to reclaimed material that includes both polymer and metal components, and especially to reclaimed metalized polymer film, i.e., a composite film having a layer of polymer and a metal layer positioned thereon. The metalized reclaimed film contemplated for use according to this invention typically has a polymeric layer of about 1-1000 μm thickness, and preferably about 1-100 μm thickness.

The metal component of the reclaimed metalized film is usually a distinct layer of the composite. The typical purposes of the metal component layer are to provide a moisture and/or gas barrier or for aesthetic decoration of the film. Hence the metal layer can be any thickness consistent with these utilities. Although the metal layer could be as thick as foil in the range of about 1-10 μm, usually the metal layer of the film being reclaimed is ultra thin. Preferably the metal of the reclaimed film was applied by a type of deposition technique such as vapor, chemical or electrical deposition. The resulting metal layers are usually less than about 1 μm thickness, and therefore, metal layers applied in these ways are determined by such analytical techniques as optical density. The preferred metal layers of reclaimed polymer film suitable for use with this invention have optical density in the range of about 1-50, more preferably about 1-20, and most preferably about 1-10. The metal content on a mass basis of metalized reclaimed film generally contemplated for use with this invention is about 0.05-1 wt %, preferably about 0.1-0.5 wt % and more preferably about 0.2-0.4 wt %.

As will be explained in more detail in this disclosure, according to this invention, the reclaimed metalized polymer film is incorporated as a raw material for the polymeric component of a newly made article. It is contemplated that the composition of the newly made article can contain up to about 95 wt % of a reclaimed metalized polymer film component, preferably 2-90 wt %, and more preferably 5-50 wt %.

This invention is very useful for consuming waste material from the production of metalized polymeric film. Sources of such waste material include scrap product generated during deviations from normal operation conditions, such as occur at production line startups, shutdowns and unexpected machine failures. Also in film production it is typical to generate scrap product by trimming film product to specification sizes. Still further, waste material can include finished product returned to the factory by distributors and customers, for example because of damage in shipment. The present invention can be used to recycle waste material that would otherwise be unreusable as raw material because of the metal coating on the polymer.

Figure 1:
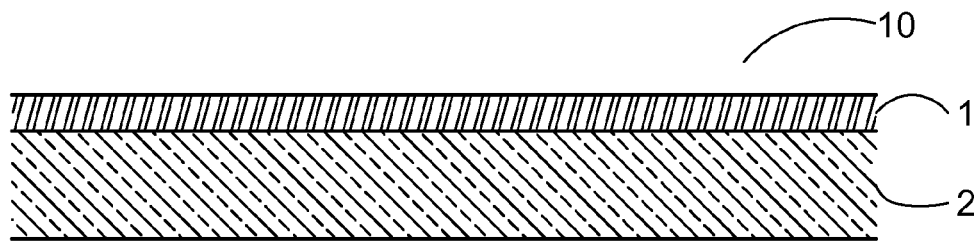

FIG. 1 illustrates a metalized film 10 according to the present invention in which a polymeric base layer 2 is in direct contact with a layer of metal 1. The metal layer is usually very thin relative to layer 2 and is deposited onto the polymer layer by conventional methods such as vapor deposition. The polymeric base layer includes metalized polymer reclaimed material. The metalized polymer reclaimed material is a blend of polymer and metal particles. The composition of the polymeric base layer may be exclusively metalized polymer reclaimed material. Usually, the polymeric base layer includes some metalized polymer reclaimed material and other polymer material. The other polymer material may be virgin material polymer, nonmetalized polymer reclaim material, metalized polymer reclaim material or a mixture of them.

Typically, the source of the metalized polymer reclaim material is a metalized polymer film. The metalized polymer film is usually shredded to a particulate form, sometimes referred to as "flake". The flake may be further processed to pellet form for ease of material handling and crystallized to reduce agglomeration. The metalized polymer reclaim material can be fed into melt processing equipment to form end use products, such as films and articles, for example molded parts. Preferably the metalized polymer reclaim material is extruded to form a polymeric base layer 2 which can then be coated with a layer of metal 1 to produce a composite film as illustrated in FIG. 1.

Figure 2:
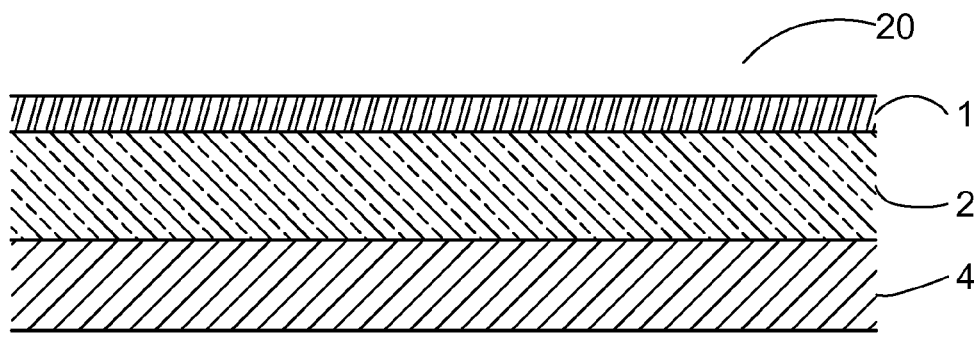

According to this invention, a two-layer metalized film structure as seen in FIG. 1 can be combined with a substrate layer 4 to form a composite film 20 as illustrated in FIG. 2. In the drawing figures, like parts have the same reference numbers. The substrate layer is usually polymeric and free of metal. Preferably, the polymer is virgin material, non-metalized polymer reclaim material or a mixture of them. The two-layer metalized film structure contributes enhanced barrier resistance to the composite film 20. The composite film can be formed by adding a preformed metalized film 10 onto a substrate layer 4 either as the substrate layer is formed, e.g., by film extrusion, or after the substrate layer is formed. Alternatively, the composite film 20 can be formed in situ in a coextrusion and coating process in which the substrate layer 4 is first extruded as a film, the polymeric base layer 2 is coextruded onto the substrate layer, and finally the metal layer 1 is deposited onto the surface of the polymeric base layer.

Figure 3:
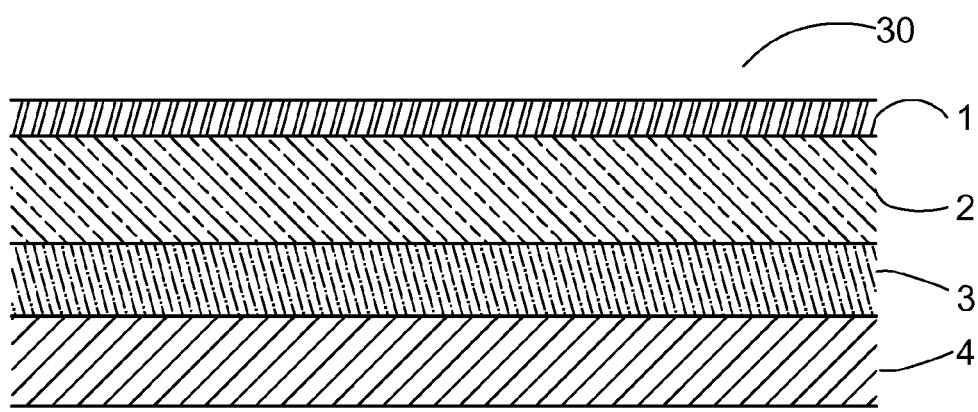

In another embodiment of this invention there is a multilayer film structure 30 as seen in FIG. 3. In this embodiment, there is a core layer 3 interposed between the polymeric base layer 2 and the substrate layer 4. The polymeric base layer, which comprises metalized polymer reclaim material is sometimes referred to herein as a skin layer. In preferred utilities, the core layer provides unique qualities to the composite 30 such as strength, puncture resistance and the like. It is contemplated that the core layer is greater thickness than the skin layer or the substrate layer.

Preferably, the polymer composition suitable for use with this invention is PET. It is contemplated that the novel use of metalized polymer reclamation can also be used with other polymers such as oriented polypropylene "OPP", oriented high density polyethylene "OHDPE", and oriented polyamide (nylon). For example, it is contemplated to shred and pelletize a film of OPP film metalized on one side by vapor deposition to an optical density ranging from 0.5-5.0. This pelletized material can then be used as a portion or the whole of the core and/or skin layer of a newly made OPP film. The reclaimed metalized OPP replaces at least a portion of the virgin polypropylene resin in such a film for cost-reduction purposes.

In a preferred embodiment, metalized polymer reclaim material comprises polymer of PET and metal of aluminum. When the pelletized or densified reclaimed material is a component in the skin layer 2 of a PET film, the aluminum particles are thought to have a beneficial effect upon subsequent aluminum metalization of the skin. That is, the aluminum particles affect the film surface of the side to be metalized so as to provide anchoring points for the aluminum vapor being deposited in a vacuum onto the film surface. This use of reclaimed metalized PET can thus improve the bond force and applied aluminum layer density compared to PET films that do not have the aluminum particles within the PET layer. Having increased bond strength and metal density, the aluminum layer provides remarkably higher barrier properties then traditionally prepared metalized PET at the same aluminum layer thickness.

When pelletized or densified metalized reclaim material is a component in the core layer of a PET film, that is, a non-surface-metalized polymer film, the dispersed aluminum particles within the reclaim material seem to provide improved barrier properties to the resultant PET film without subsequent metalization. A tortuous path for migrating species to transfer across through the film that is created by higher levels of metal particles of the core layer improves moisture vapor transmission rate "MVTR" and oxygen transmission rate "OTR" relative to conventional PET film shown in FIG. 1. In addition, at sufficiently high concentrations of metalized reclaim, the film can act as a susceptor for microwave "MW" radiation. A susceptor is a material that absorbs electromagnetic energy and converts it to heat. Typical susceptor uses are browning food products in MW ovens and it is a common use of very low optical density aluminum deposition (very thin layer) on PET films. The use of aluminum reclaim material in the core of PET film is contemplated to perform the same function as the very thin layer of aluminum in the MW field with the advantage that the PET film does not need to be subsequently metallized for added expense.

Thus according to this invention a polyester film that has been evaporatively metalized can be reclaimed by shredding and densifying. The reclaimed material is subsequently used as a reclaim feed stream in production of biaxially oriented polyester film which can be metalized on the surface containing the metalized reclaim stream. The resulting metalized polyester film including metalized polymer reclaim material in the polyester layer provides improved oxygen barrier, compared to an equivalent structure film of polyester that does not contain such reclaim stream.

EXAMPLES

This invention is now illustrated by examples of certain representative embodiments thereof, wherein all parts, proportions and percentages are by weight unless otherwise indicated. The term "gauge" in this disclosure means a measure of plastic sheet thickness and corresponds to 3.94 gauge units per μm.

Comparative Example 1: Moisture Resistance of Metalized PET Film

Polyethylene terephthalate PET film was continuously cast and stretched to form an oriented PET film of 36 gauge (9.1 μm) nominal thickness. The polymer contained no metalized reclaim. This oriented PET sheet was plasma treated on one side and then aluminum was placed by vapor deposition on the treated side to a nominal thickness of about 3.0 optical density ("O.D"). Ten randomly located sample swatches of the metalized film were obtained and subjected to analyses for moisture vapor transmission rate ("MVTR") by ASTM method F1249 and for optical density ("OD") by method CMP OD-1. Results are shown in Table I, below.

Example 2: Moisture Resistance of Metalized Film with 10% Metalized Reclaim

Reclaimed metalized PET was obtained by trimming PET film on which had been deposited a layer of aluminum metal of about 3.0 nominal optical density. The PET of this film contained no metalized reclaim material, i.e., there was no aluminum in the PET. This metalized film was shredded into a flake and densified to form pellets. The densified reclaimed metalized PET contained 0.33 wt % aluminum. The reclaimed metalized PET pellets were melt blended with non-metalized reclaimed PET film at a 1:9 weight ratio. The melt blend was cast and stretched to form PET film containing 10 wt % of metalized reclaimed PET. The plasma treatment and aluminum deposition procedure of Comp. Ex. 1 was repeated to place an aluminum layer on the this PET film to form an aluminum metal-coated film. Three randomly located sample swatches of the metalized film were obtained and sampled for MVTR and OD. Results are also shown in Table I.

Comparative Example 3: Moisture Resistance of Metalized PET Film

The film preparation procedure of Comparative Example 1 was repeated except that the PET film was not plasma treated before aluminum layer deposition. Three randomly located sample swatches of the metalized film were obtained and subjected to analysis for MVTR and OD. Results are also shown in Table I, below.

Example 4: Moisture Resistance of Metalized Film with 5% Metalized Reclaim

Reclaimed metalized PET was obtained from trimmings of PET film containing no metalized reclaim material and coated with aluminum to a nominal optical density of about 3.0. This reclaimed metalized film was shredded and densified to form pellets as in Ex. 2. The reclaimed metalized PET pellets were melt blended with pellets formed from the non-plasma treated PET of Comp. Ex. 3 at a 1:19 weight ratio to produce 5 wt % reclaimed metalized PET. The metalized film preparation procedure of Comp. Ex. 3 was repeated using the 5 wt % reclaimed metalized PET blend to form an aluminum metal-coated oriented PET film. Three randomly located sample swatches of the metalized film were obtained and sampled for MVTR and OD. Results are also shown in Table I.

TABLE I

| | Comp. Ex. 1 | | Ex. 2 | | Comp. Ex. 3 | | Ex. 4 | |
|---|---|---|---|---|---|---|---|---|
| | OD | MVTR (gm/100 in.$^2$/day) | OD | MVTR (gm/100 in.$^2$/day) | OD | MVTR (gm/100 in.$^2$/day) | OD | MVTR (gm/100 in.$^2$/day) |
| | 3.41 | 0.2995 | | | | | | |
| | 2.83 | 0.2471 | | | | | | |
| | 2.98 | 0.2418 | | | | | | |
| | 3.20 | 0.2810 | | | | | | |
| | 3.04 | 0.2978 | | | | | | |
| | 3.09 | 0.2613 | | | | | | |
| | 3.00 | 0.2485 | | | | | | |
| | 2.72 | 0.2442 | 3.05 | 0.1182 | 2.89 | 0.2411 | 3.52 | 0.1094 |
| | 2.82 | 0.2479 | 2.81 | 0.1082 | 2.98 | 0.2048 | 3.52 | 0.1094 |
| | 2.79 | 0.3084 | 3.09 | 0.1582 | 2.85 | 0.2015 | 3.35 | 0.1885 |
| Average value: | | 0.2677 | | 0.1282 | | 0.2158 | | 0.1357 |

Average MVTR values were calculated from each of the multiple sample performance analyses for Comp. Exs. 1, and 3, and Exs. 2 and 4. As seen from Table I, the MVTR value for the treated PET film having 10% reclaimed metalized film dropped from 0.2677 of the metalized virgin PET film to 0.1281 (reduction of 52%). Similarly, for the untreated PET film, the MVTR reduction was from 0.2158 to 0.1357 (reduction of 37%).

Comparative Example 5: Oxygen Transmission of Metalized PET Film

A metalized treated virgin PET film was prepared similarly as in Comp. Ex. 1. Multiple random sample swatches were taken and analyzed for oxygen transmission rate ("OTR") by method ASTM D3985 and for OD. Data are shown in Table II.

Examples 6 and 7: Oxygen Transmission of Metalized PET Film with 5% and 10% Reclaim Reclaimed metalized PET was obtained from trimmings of PET film coated to a nominal optical density of about 3.0 with aluminum metal. This metalized film was shredded into a flake and densified to form pellets having 0.33% aluminum. The reclaimed metalized PET pellets were melt blended with pellets of non-metalized PET film reclaim material of the cast and stretched PET film described in Comp. Ex. 5. The metalized film production procedure of Comp. Ex. 5 was repeated using the oriented PET film containing reclaimed metalized PET to form aluminum metal-coated films. For Ex. 6, the reclaimed metalized PET was blended with non-metalized PET at a 1:19 weight ratio to produce 5 wt % reclaimed metalized PET. For Ex. 7, the ratio was 1:9 to produce a 10 wt % reclaimed metalized PET. Randomly located sample swatches of the metalized films were obtained and sampled for OTR and OD. Results are also shown in Table II.

TABLE II

| | Comp. Ex. 5 | | Ex. 6 | | Ex. 7 | |
|---|---|---|---|---|---|---|
| | OD | OTR (cc/100 in.²/day) | OD | OTR (cc/100 in.²/day) | OD | OTR (cc/100 in.²/day) |
| | 3.02 | 0.077 | | | 2.99 | 0.039 |
| | 2.91 | 0.080 | 2.96 | 0.036 | 3.07 | 0.032 |
| | 2.93 | 0.082 | 3.10 | 0.050 | 3.01 | 0.037 |
| | 3.02 | 0.075 | 3.10 | 0.043 | 2.98 | 0.041 |
| | 2.92 | 0.094 | 3.12 | 0.006 | 3.03 | 0.040 |
| Average | | 0.082 | | 0.034 | | 0.038 |

Results of Table II show that the virgin PET film metalized with aluminum to an optical density of about 3.0, had an oxygen transmission rate of 0.082 cc/100 in²/day on average. The average oxygen transmission rates for similarly metalized PET films that included 5 and 10 wt % reclaimed metalized PET in the polymeric layer were reduced to about half that value.

Comparative Example 8: Oxygen Transmission of Metalized PET Film

A metalized virgin PET film was prepared similarly as in Comp. Ex. 3. Multiple random sample swatches were taken and analyzed for OTR and OD. Data are shown in Table III.

Examples 9 and 10: Oxygen Transmission of Metalized PET Film with 5% and 10% Reclaim Reclaimed metalized PET was obtained from trimmings of PET film of polymer containing no metalized reclaim material and with an aluminum coating of 3.0 nominal optical density. This metalized film was shredded into a flake and densified to form pellets containing 0.33 wt. % aluminum. The reclaimed metalized PET pellets were blended with pellets of non-metalized PET film of the cast and stretched base film described in Comp. Ex. 8 and melt blended therewith. The metalized film production procedure of Comp. Ex. 8 was repeated using the PET blends to form aluminum metal-coated films. For Ex. 9, the reclaimed metalized PET was blended with virgin PET at a 1:19 weight ratio to produce 5 wt % reclaimed metalized PET. For Ex, 10, the ratio was 1:9 to produce a 10 wt % reclaimed metalized PET. Randomly located sample swatches of the metalized films were obtained and sampled for OTR and OD. Results are also shown in Table III.

TABLE III

| | Comp. Ex. 8 | | Ex. 9 | | Ex. 10 | |
|---|---|---|---|---|---|---|
| | OD | OTR (cc/100 in.²/day) | OD | OTR (cc/100 in.²/day) | OD | OTR (cc/100 in.²/day) |
| | 3.10 | 0.064 | | | 3.08 | 0.034 |
| | 2.93 | 0.065 | | | 3.07 | 0.016 |
| | 3.04 | 0.076 | | | 3.07 | 0.035 |
| | 3.07 | 0.070 | | | 3.10 | 0.030 |
| | 2.78 | 0.068 | 3.23 | 0.043 | 3.04 | 0.041 |
| Average | | 0.069 | | 0.043 | | 0.031 |

Results of Table III show that the virgin PET film metalized with aluminum to an optical density of about 3.0 had an oxygen transmission rate of 0.069 cc/100 in²/day on average. The average oxygen transmission rate for similarly metalized PET films that included 5% reclaimed metalized PET in the polymeric layer was reduced to about 62% of that value. Moreover, increasing the reclaimed metalized PET content of the polymeric layer to 10% reduced the OTR value to 45% of the virgin PET metalized film OTR.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims. All U.S. patents named in this disclosure are hereby fully incorporated by reference herein.

What is claimed is:

1. A method of making an article resistant to oxygen and moisture vapor transmission comprising the steps of
   (A) providing a reclaimed metalized polymer film having a metallic layer of metal in direct contact with a polymeric layer of a polymer,
   (B) forming the reclaimed metalized polymer film into reclaimed particles,
   (C) blending the reclaimed particles of the reclaimed metalized polymer film with particles of other polymer material free of metal particles to form a mixture comprising about 0.1 wt % to about 95 wt % of the reclaimed particles and a complementary amount of the other polymer material, in which the polymer of the polymeric layer is in direct contact with the metal of the metallic layer when the mixture is formed,
   (D) melt processing the mixture to form a reclaimed composition comprising metal particles uniformly dispersed in a polymeric matrix, and
   (E) forming the reclaimed composition into an article resistant to oxygen and moisture vapor transmission.

2. The method of claim 1 in which polymer of the article consists essentially of polyethylene terephthalate and the metal of the article consists essentially of aluminum.

3. The method of claim 1 in which the reclaimed metalized polymer film is waste material recovered from a process of producing metalized polyester film.

4. The method of claim 1 in which the other polymer material is selected from the group consisting of non-metalized reclaimed polymer, a virgin polymer, and a combination thereof.

5. A method of recycling metalized polyester film comprising the steps of recovering waste material from a process of producing multilayer metalized polyester film, the waste material consisting essentially of film having a base layer of polymer and a metal layer in direct contact with the base layer, forming the waste material into reclaimed particles, blending the reclaimed particles with particles of other polymer material free of metal to form a mixture comprising about 0.1 wt % to about 95 wt % of the waste material and a complementary amount of the other polymer material, melt processing the mixture to form a reclaimed composition comprising metal particles uniformly dispersed in a polymeric matrix, and forming the reclaimed composition into an article resistant to oxygen and moisture vapor transmission.

6. The method of claim 5 in which the other polymer material is selected from the group consisting of non-metalized reclaimed polyester, a virgin polyester, and a combination thereof.

* * * * *